Aug. 20, 1968  C. B. ASKE, JR., ET AL  3,397,918
VEHICLE WHEEL TRIM

Filed Jan. 4, 1967  4 Sheets-Sheet 1

INVENTORS
CHARLES B. ASKE JR. &
EDWARD L. WOOD

Everett G. Wright
ATTORNEY

Aug. 20, 1968   C. B. ASKE, JR., ET AL   3,397,918
VEHICLE WHEEL TRIM

Filed Jan. 4, 1967   4 Sheets-Sheet 2

INVENTORS
CHARLES B. ASKE JR. &
EDWARD L. WOOD

Everett F. Wright
ATTORNEY

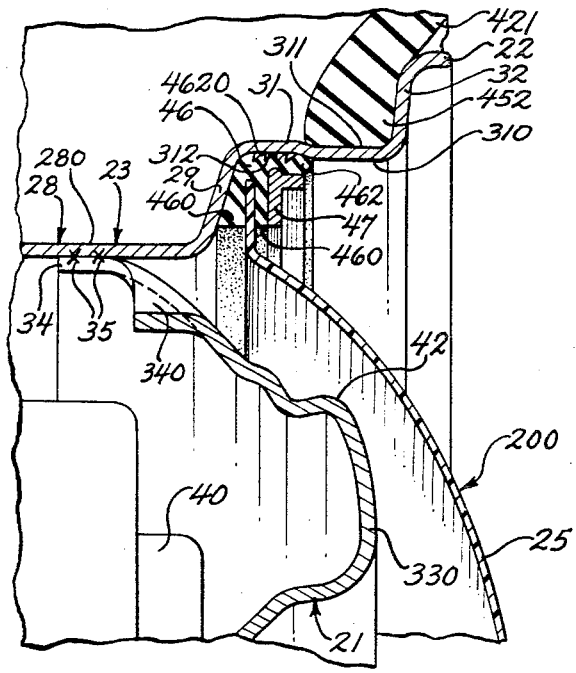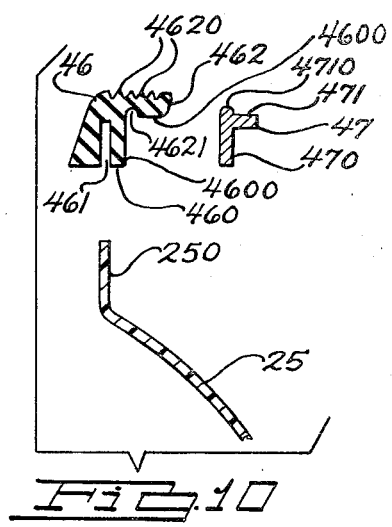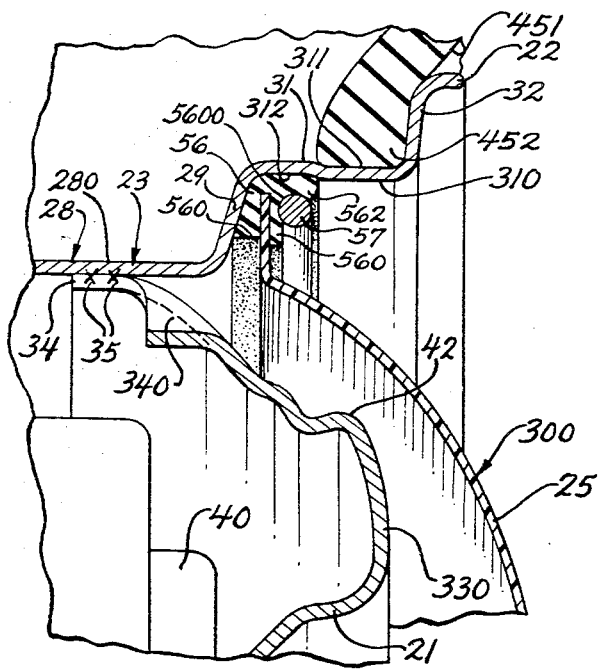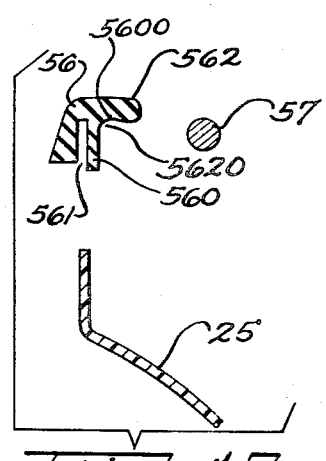

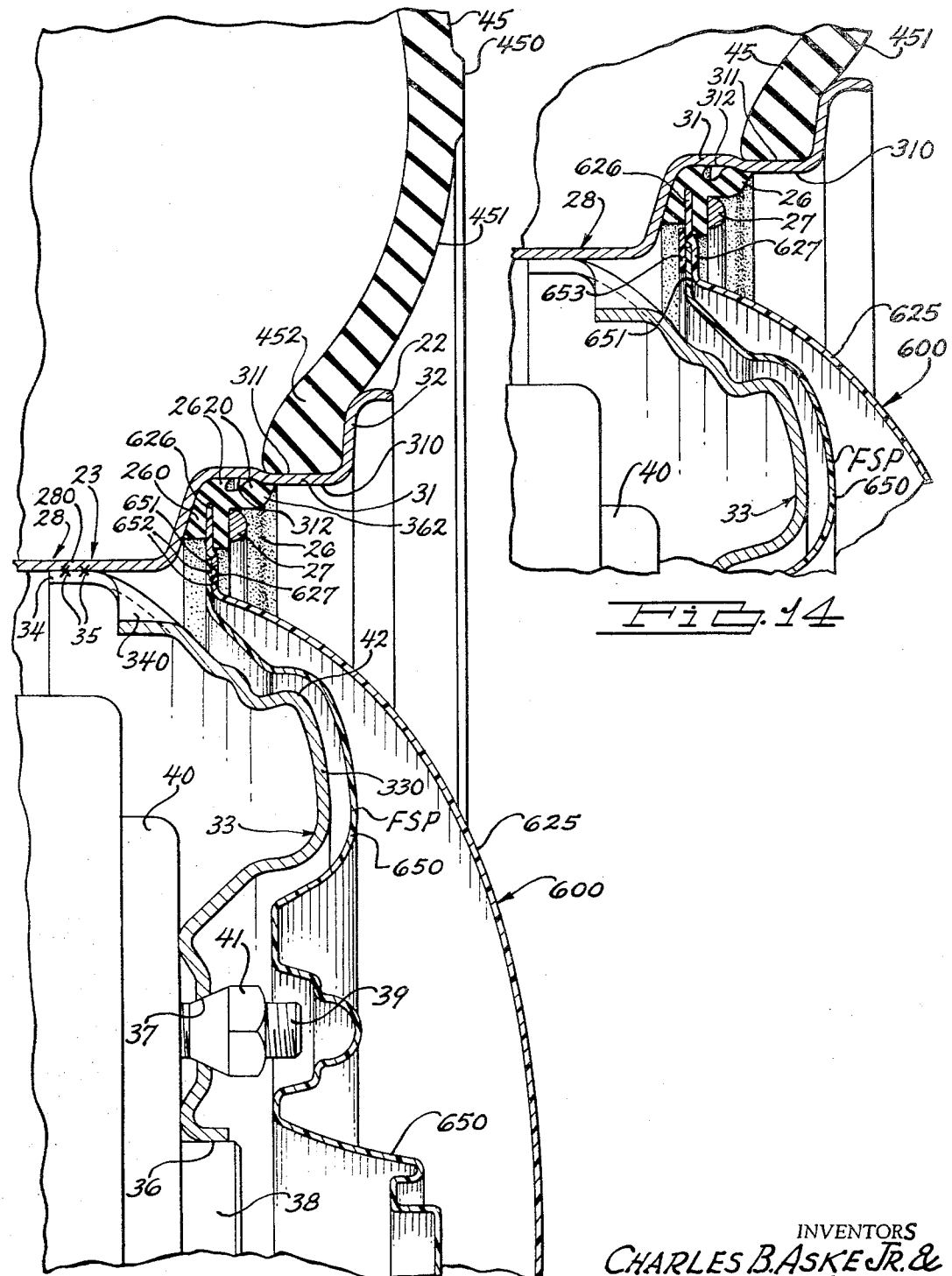

United States Patent Office 3,397,918
Patented Aug. 20, 1968

3,397,918
VEHICLE WHEEL TRIM
Charles B. Aske, Jr., Birmingham, Mich., and Edward L. Wood, Gig Harbor, Wash., assignors to Gar Wood Industries, Inc., a corporation of Michigan
Filed Jan. 4, 1967, Ser. No. 607,235
11 Claims. (Cl. 301—37)

ABSTRACT OF THE DISCLOSURE

A vehicle wheel cover disposed within the axially outer tire bead seat annulus of the drop center rim of a modern vehicle wheel preferably formed of transparent plastic of selected color, tint and/or reflectivity having a radially extending anchorage flange over which is telescopingly assembled an anular resilient anchorage ring formed to seat preferably within an anchorage recess in said tire bead seat annulus, and an expansible anchorage ring engageable with said annular resilient anchorage ring after the assembly of said wheel cover and said anchorage ring is telescoped to axial refusal within the tire bead seat annulus of said wheel rim whereby to removably secure said vehicle wheel trim concentrically on said vehicle wheel.

---

This invention relates to improvements in vehicle wheel trim or wheel covers preferably formed of plastic including improved, simplified, effective and economical means for removably securing such vehicle wheel trim on vehicle wheels.

The primary object of the instant invention is to provide an improved and simplified vehicle wheel trim comprising a formed wheel cover element having a radially extending circumferential mounting flange and means for mounting said wheel cover element on a vehicle wheel in spaced relationship over the wheel spider thereof. The said mounting means comprising an annular resilient anchorage ring telescoped on the outer periphery of said circumferential wheel cover mounting flange adapted to seat preferably in an axially inner annular anchorage recess formed in the axially outer tire bead seat annulus of a modern vehicle wheel, and an expansible spring retainer ring engaging said resilient anchorage ring maintaining said vehicle wheel trim concentrically on said vehicle wheel within said axially outer tire bead seat annulus thereof.

Another object of the invention is to provide a wheel cover for vehicle wheels which is in essence an enlarged hub cap covering the wheel spider in spaced relationship thereto and secured by simple effective means to the vehicle wheel substantially at the juncture of the tire bead seat flange and the outer side wall of a conventional drop center rim, the said drop center rim having an axially inner annular anchorage recess formed in its tire bead seat annulus adjacent the outer side wall of the drop center rim.

Another object of the invention is to provide an ornamental dome or other suitably shaped vehicle wheel cover of the type hereinabove set forth formed of transparent plastic of a selected color or tint including therewithin or disposed to the axial rear thereof and secured in spaced relationship thereto a reflective ornamental preferably plastic disc or the like of a selected design and color creating an ornamental vehicle wheel trim having an illusion of depth and perspective.

A further object of the invention is to provide an ornamental wheel cover as aforesaid providing safety features resulting from the high reflectance thereof, particularly when the inner ornamental plastic disc is first surface preferably chrome plated and the outer transparent plastic is relatively lightly tinted in red or other selected color.

Other objects of the invention will become apparent by reference to the following detailed description taken in connection with the accompanying drawings, in which.

Figures 1, 2, 3:
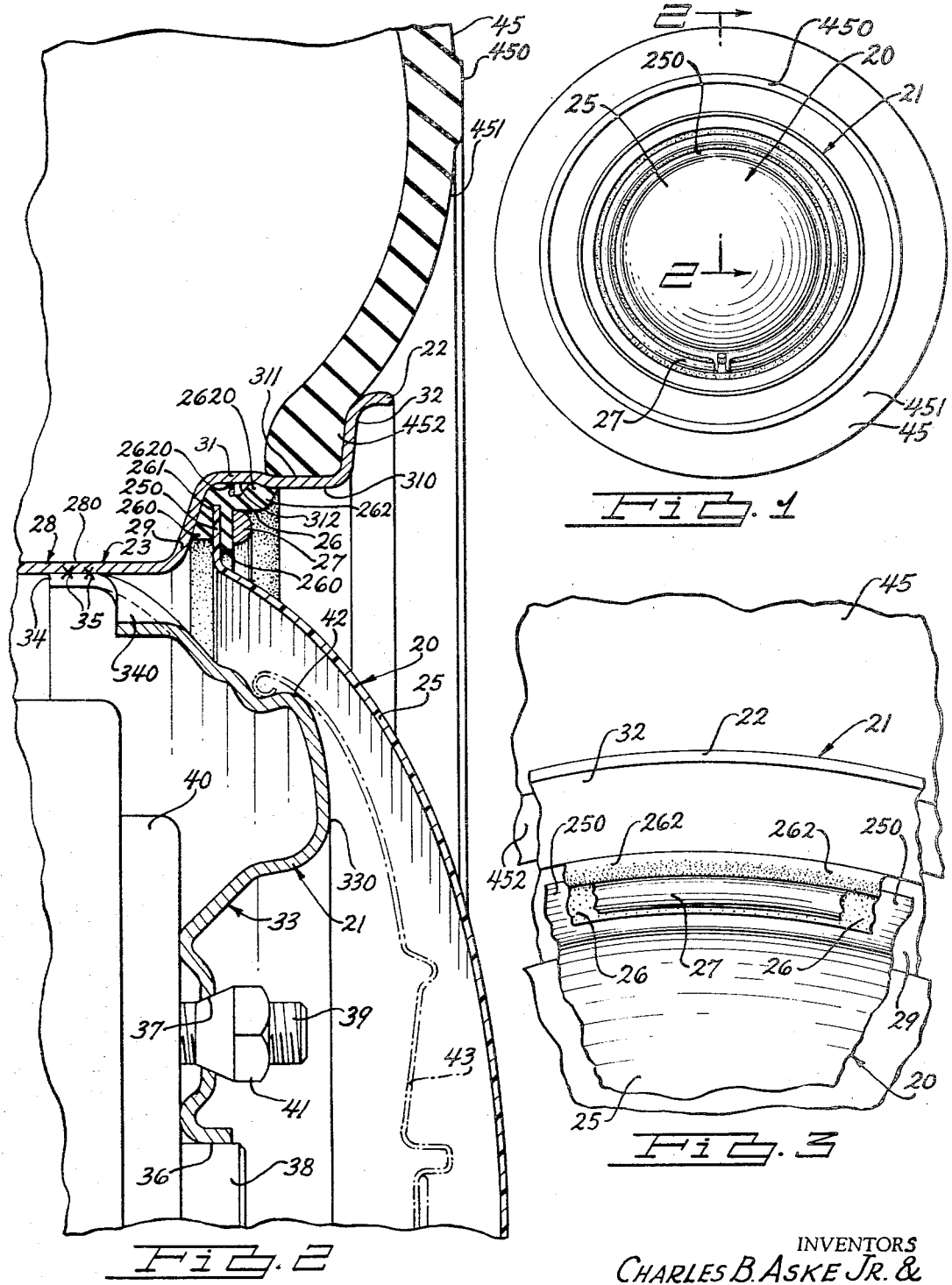
FIG. 1 is a side elevational view of a vehicle wheel having wheel trim in the form of a wheel cover of the invention mounted thereon.
FIG. 2 is an enlarged fragmentary sectional view taken on the line 2—2 of FIG. 1.
FIG. 3 is an enlarged fragmentary elevational view of the embodiment of vehicle wheel trim of the invention shown in FIGS. 1 and 2, parts being successively broken away.
Figure 4:
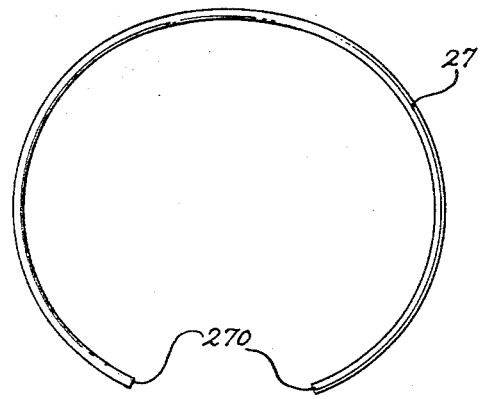

FIG. 4 is a side elevational view of the half-round expansible spring retainer ring employed in the embodiment of the invention disclosed in FIGS. 1–3 inclusive shown in its expanded manufactured form and attitude prior to assembly on the resilient wheel trim anchorage means after the vehicle wheel trim and its resilient anchorage means are assembled together and are telescoped in their assembled relationship to axial refusal within the tire bead seat annulus of the vehicle wheel.

Figure 5:
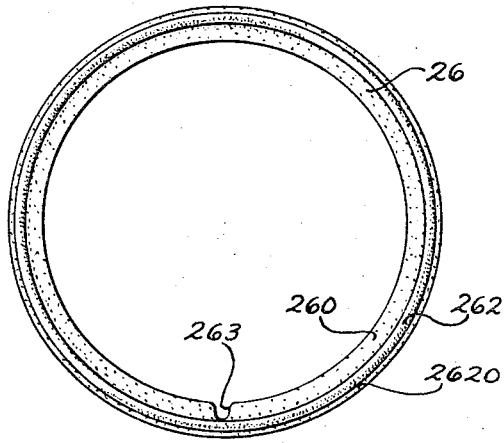

FIG. 5 is a side elevational view of the resilient anchorage ring preferably employed in the embodiment of the invention disclosed in FIGS. 1–4 inclusive.

Figure 6:
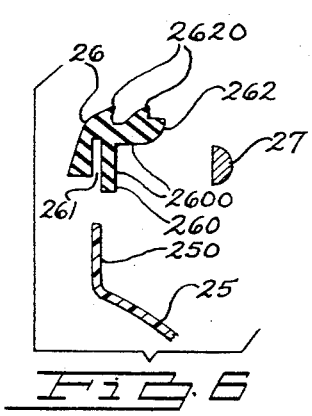

FIG. 6 is an exploded sectional view showing the outer radially disposed circumferential anchorage flange of the wheel cover element of the embodiment of the invention disclosed in FIGS. 1–5 inclusive, and the resilient anchorage ring and spring retainer ring employed to removably secure said wheel cover element on a vehicle wheel.

Figure 7:
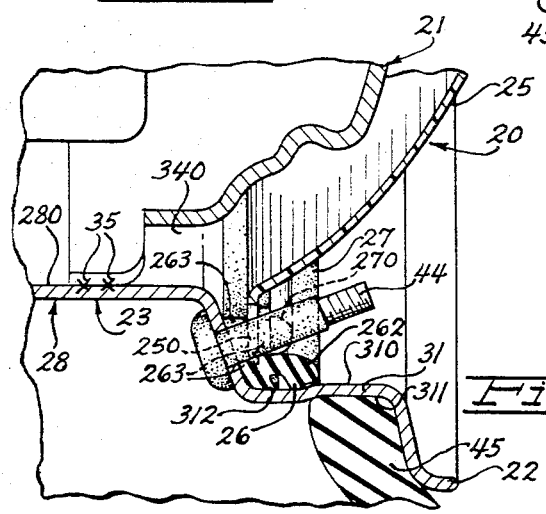

FIG. 7 is a fragmentary sectional view similar to FIG. 2 except that it is taken at the place where the tire valve stem extends from the side wall of the drop center of the drop center rim of the vehicle wheel.

Figure 8:
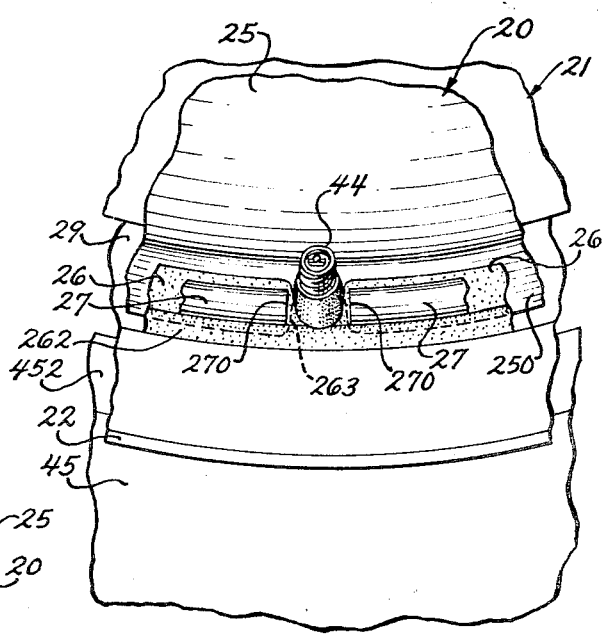

FIG. 8 is a fragmentary elevational view taken in the region where the tire valve stem extends from the drop center rim.

FIG. 9 is an enlarged fragmentary sectional view similar to FIG. 2 showing another embodiment of the invention which employs a fine toothed resilient anchorage means together with an expansible angular shaped spring retainer ring.

FIG. 10 is an exploded sectional view showing the construction of the several elements of the embodiment of the invention disclosed in FIG. 9.

FIG. 11 is an enlarged fragmentary sectional view similar to FIGS. 2 and 9 showing another embodiment of the invention which employs a toothless outer surfaced resilient anchorage means together with an expansible full round spring retainer ring.

FIG. 12 is an exploded sectional view showing the construction of the several elements of the invention disclosed in FIG. 11.

FIG. 13 is an enlarged fragmentary sectional view similar to FIG. 2 showing still another embodiment of the invention similar to that shown in FIGS. 1–8 inclusive except that the radially disposed circumferential anchorage flange of the wheel cover element is made wider and is offset to accommodate and center an inner ornamental preferably reflective disc.

FIG. 14 is a fragmentary sectional view similar to FIG. 13 showing the inner, ornamental preferably reflective disc removably secured by tape means to the outer wheel cover element.

Referring now to the drawings wherein like reference characters refer to like and corresponding parts throughout the several views, the particular vehicle wheel trim 20 of the invention shown in FIGS. 1–8 inclusive preferably consists of a bubble or generally hollow dome shaped transparent wheel cover element 25 of a selected design and color formed with an integral axially extending circumferential anchorage flange 250, a resilient anchorage means 26 telescoped or otherwise positioned over the said circumferential anchorage flange 250 of the wheel cover element 25, and a preferably ornamental expansible retainer ring 27 disposed over and engaging said resilient anchorage means 26. The said wheel cover element 25 and its resilient anchorage means 26 are first assembled together with the said resilient anchorage means 26 disposed around and over the said anchorage flange 250, and the said assembly is then positioned telescopingly as a unit on a vehicle wheel 21 within the tire bead seat annulus 310 of the tire bead seat 31 thereof, and is firmly retained in such wheel-mounted position by the said expansible retainer ring 27, all as hereinafter described in detail.

The said modern vehicle wheel 21 with which the invention is used has a drop center rim 23 composed of a central channel or drop center 28 having side walls 29 and a base 280. An annular tire bead seat 31 extends laterally outwardly from each of the side walls 29 of the drop center 28. Each said tire bead seat 31 preferably has an annular radially outwardly facing tire bead seat pocket 311 formed therein adjacent a tire bead seat flange 32 extending radially outwardly therefrom, the said tire bead seat flange 32 being axially outwardly curved at its upper portion to form an axially disposed outer lip 22. The tire bead seat flange 32 is ofttimes referred to as the wheel flange, the said lip 22 is ofttimes referred to as the lip of the wheel rim, and the radially inner exposed annular face of the tire bead seat 31 is generally referred to as the tire bead seat annulus 310. The formation of the said tire bead seat pocket 311 in the tire bead seat annulus 310 provides an annular radially inwardly facing tire bead seat anchorage recess 312 which readily is employed to receive at least one of the preferably two elongated axially spaced anchorage teeth 2620 formed on the outer periphery of the axially disposed leg 262 of the resilient anchorage means 26 of the vehicle wheel trim 20 as hereinafter described in detail. The said resilient anchorage means 26 may be formed of live white, black or other colored rubber or other suitable resilient material.

Within the drop center 28 of the drop center rim 23 is a wheel spider 33 having an axially disposed flange 34 which is secured to the base 280 of the drop center 28 of the drop center rim 23 by such means as welding at 35. The said wheel spider 33 is generally provided with a central hub aperture 36 with securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the wheel spider 33 is generally scalloped out and formed at 340 at intervals around the periphery thereof to provide brake drum ventilation and/or added structural strength to the vehicle wheel 21. The spider 33 is generally formed with an annular axially outwardly extending collar 330 which is preferably provided with a plurality of hub cap retainer nubs 42 over which a convention hub cap 43 shown in dot and dash lines in FIG. 2 may be sprung for securement onto the vehicle wheel 21. However, in the instant invention, the hub cap 43 need not be employed, since the wheel spider may be suitably painted and/or provided with chrome finished wheel securing nuts. Also, other attractive preferably relatively high reflectance ornamentation may be used on or over the wheel spider 33 spaced from the wheel cover element 25. However, if the vehicle wheel 21 is provided with a hub cap 43 or other ornamental element of relatively high reflective qualities, such may be used with a suitably transparent wheel cover element 25 of a selected color or tint spaced thereover thereby providing a highly desirable aesthetic effect with third dimension qualities.

The particular tire 45 illustrated in the drawings is a tubeless tire having a scuff bead 450 extending from its side wall 451. The tire side wall 451 terminates in a suitable mounting bead 452 which seats in the annular tire bead seat pocket 311 formed in the tire bead seat 31 of the wheel rim 23.

The vehicle wheel trim 20 disclosed in FIGS. 1–8 inclusive includes a generally dome or other suitably shaped wheel cover element 25 preferably molded or otherwise formed of a transparent plastic material of a selected color or tint terminating at its outer periphery in a circumferential radially outwardly disposed anchorage flange 250. Alternatively, it is obvious that the wheel cover element 25 of the vehicle wheel trim 20 may be of other material and design when it is not desired to view the wheel spider, the hub cap, or other ornamental reflective structure therethrough.

As best shown in FIGS. 1, 2, 5 and 6, the resilient preferably live rubber annular anchorage means or ring 26 is generally angular in shape and has a radially inwardly disposed annular leg 260 and an axially outwardly disposed annular leg 262. The said radially inwardly disposed annular leg 260 is preferably provided with a radially inwardly disposed annular slot 261 therein to permit the said annular resilient anchorage ring 26 to be assembled onto and over the circumferential radially outwardly disposed anchorage flange 250 of the wheel cover element 25. The axially outwardly disposed annular leg 262 of the said resilient anchorage ring 26 is preferably provided with a pair of axially spaced radially extending circumferential teeth 2620 thereon, at least one and preferably both of which enter the tire bead seat anchorage recess 312 of the annular tire bead seat 31 adjacent the axially outer side wall 29 of the drop center rim 23 of a vehicle wheel 21 when vehicle wheel trim 20 is mounted thereon as best shown in FIG. 2. The said radially inwardly disposed annular leg 260 of the annular anchorage ring 26 is preferably notched at 263 to accommodate the valve stem 44 extending from the outer side wall 29 of the drop center 28 of the drop center wheel rim 23.

The said radially inwardly disposed annular leg 260 and the axially outwardly disposed annular leg 262 of the resilient anchorage means 26 form an annular axially and radially disposed angular seat 2600 therein which accommodates and receives the expansible spring retainer ring 27 which maintains the vehicle wheel trim 20 in its proper concentrically mounted position on the vehicle wheel 21 after the assembly of the wheel cover element 25 and the annular resilient anchorage means 26 has been telescoped as a unit to axial refusal within the tire bead seat annulus 310 of the drop center rim 23 of the said vehicle wheel 21.

The expansible spring retainer ring 27 may be half round in cross section and formed to a diameter somewhat greater than the diameter of the angular annular seat 2600 of the resilient anchorage means 26 leaving an open space at the open ends 270 thereof as shown in FIG. 4 so that, when the said expansible spring retainer ring 27 is sprung manually substantially closed and positioned in the said angular annular seat 2600 of the resilient anchorage means 26 as best shown in FIG. 2 with the open ends 270 thereof disposed on opposite sides of the valve stem 44 extending from drop center wheel rim 23, and the said spring retainer ring 27 is released, it will firmly and securely removably retain the vehicle wheel trim 20 in its desired concentric and axially inner wheel-mounted position shown in FIGS. 1, 2, 7 and 8.

The said vehicle wheel trim 20 may be removed from its said wheel-mounted position on a vehicle wheel 21 by prying loose first one end of the open resilient anchorage ring 27, and then manually releasing it from the said axially and radially disposed angular annular seat 2600 of the resilient annular anchorage means 26. The said assembly of the wheel cover element 25 and the resilient anchorage means 26 now may be telescoped axially outwardly from the annular tire bead seat annulus 310 of the vehicle wheel 21.

Referring now to the embodiment of the invention disclosed in FIGS. 9 and 10, the wheel trim 200 is like and similar to the wheel trim 20 of the embodiment of the invention disclosed in FIGS. 1–8 inclusive, except that a resilient preferably live rubber annular anchorage means or ring 46 and an expansible angular spring retainer ring 47 have been substituted respectively for the resilient anchorage ring 26 and the spring retainer ring 27 of the said embodiment of the invention shown in FIGS. 1–8 inclusive, and that a plurality of relatively small axially spaced circumferential teeth 4620 have been substituted on the annular resilient anchorage ring 46 for the preferably two larger circumferential teeth 2620 of the annular resilient anchorage ring 26.

The resilient preferably live rubber annular anchorage means or ring 46 may be formed of white, black or other colored rubber or other suitable resilient material, is generally angular in shape, and has a radially inwardly disposed annular leg 460 and an axially outwardly disposed annular leg 462. The said radially inwardly disposed annular leg 460 is provided with a radially inwardly disposed annular slot 461 therein to permit the said annular resilient anchorage ring 46 to be assembled onto and over the circumferential radially outwardly disposed annular anchorage flange 250 of the wheel cover element 25. The axially outwardly disposed annular leg 462 of the said resilient anchorage ring 46 is preferably provided with a plurality of relatively small outer axially spaced circumferential teeth 4620 thereon which enter the tire bead seat anchorage recess 312 of the annular tire bead seat 31 adjacent the axially outer side wall 29 of the crop center rim 23 of a vehicle wheel 21 when vehicle wheel trim 200 is mounted thereon as best shown in FIG. 10.

The said radially inwardly disposed annular leg 460 and the axially outwardly disposed annular leg 462 of the resilient anchorage means 46 form a radially and axially disposed angular annular seat 4600 therein which accommodates and receives the expansible angular spring retainer ring 47 which maintains the vehicle wheel trim 200 in its proper concentrically mounted position on the vehicle wheel 21 after the assembly of the wheel cover element 25 and the annular resilient anchorage means 46 has been telescoped as a unit to axial refusal within the tire bead seat annulus 310 of the drop center rim 23 of the said vehicle wheel 21.

In the embodiment of the invention disclosed in FIGS. 9 and 10, the expansible spring retainer ring 47 is angular in cross section and has a radially inwardly disposed leg 470 and an axially outwardly disposed leg 471 as indicated in FIG. 10. The said expansible spring retainer ring 47 is formed to a diameter somewhat greater than the diameter of the angular seat 4600 of the resilient anchorage means 46 leaving an open space between the free ends of the said expansible spring retainer ring 47 so that, when the said expansible spring retainer ring 47 is collapsed manually and positioned in the said angular annular seat 4600 of the resilient anchorage means 46, the open ends thereof will be disposed on opposite sides of the valve stem 44 extending from the drop center rim 23. The said expensible spring retainer ring 47 is preferably provided with a continuous circumferentially disposed outer rib 4710 at the heel of the axially outwardly disposed leg 471 thereof, which rib 4710 seats in the inner complementary groove 4621 provided in the axially outwardly disposed leg 462 of the resilient anchorage means 46. This construction provides assurance that the resilient anchorage means 46 and the expansible annular spring retainer ring 47 will releasably maintain the wheel cover element 25 in its proper wheel-mounted position on the vehicle wheel 21 as best shown in FIG. 2. This construction further provides a retainer ring 47 having a substantial area exposed to view for ornamental purposes, and, at the same time permits the retainer ring 47 to be made sufficiently large to substantially cover the resilient anchorage means 46.

Referring now to the embodiment of the invention disclosed in FIGS. 11 and 12, the wheel trim 300 is like and similar to the wheel trim 20 of the embodiment of the invention disclosed in FIGS. 1–8 inclusive, except that a resilient preferably live rubber annular anchorage means or ring 56 and an expansible round spring retainer ring 57 have been substituted respectively for the anchorage means 26 and the retainer ring 27 of the said embodiment of the invention shown in FIGS. 1–8 inclusive, and that the teeth 2620 have been eliminated from the axially outwardly disposed annular leg 562 of the said resilient anchorage means 56.

It will be noted by reference particularly to FIG. 12 that the said resilient annular anchorage ring 56 is also generally angular in shape, and has a radially inwardly disposed annular leg 560 and an axially outwardly disposed annular leg 562. The said radially inwardly disposed annular leg 560 is provided with a radially inwardly disposed annular slot 561 therein to permit the said annular resilient anchorage ring 56 to be assembled onto and over the circumferential radially outwardly disposed annular anchorage flange 250 of the wheel cover element 25. The axially outwardly disposed leg 562 of the resilient annular anchorage ring 56 is preferably of substantial thickness and is provided with a suitable annular arcuate groove 5620 therein adjacent the radially inwardly disposed annular leg 560 of the said resilient anchorage ring 56, which annular arcuate groove 5620 provides an annular seat 5600 for the expansible round spring retainer ring 57 at the juncture of the radially inwardly disposed annular leg 560 and the axially outwardly disposed annular leg 562 of the said resilient annular anchorage ring 56.

The said annular seat 5600 of the resilient annular anchorage ring 56 accommodates and receives the said expansible round retainer ring 57 which maintains the vehicle wheel trim 300 in its proper concentrically mounted position on the vehicle wheel 21 after the assembly of the wheel cover elements 25 and the resilient anchorage means 56 has been telescoped as a unit to axial refusal within the tire bead seat annulus 310 of the drop center rim 23 of the said vehicle wheel 21. In its wheel-mounted position, the said expansible round retainer ring 57 constantly and firmly urges the entire axially outwardly disposed annular leg 562 in the annular tire bead seat anchorage recess 312 of the said annular tire bead seat 31 of the vehicle wheel 21. It has been found that because of the relatively great pressure that is applied by a full round expansible spring retainer ring on the resilient anchorage ring 56, no teeth need be used on the axially outwardly disposed annular leg 562 thereof to assure that the vehicle wheel trim 300 will remain removably mounted on the vehicle wheel 21 as aforesaid.

Referring now to the embodiment of the invention disclosed in FIGS. 13 and 14, the wheel trim 600 is like and similar to the wheel trim 20 of the embodiment of the invention disclosed in FIGS. 1–8 inclusive, except that the wheel cover element 625 which is substituted for the wheel cover element 25 of the embodiment of the invention disclosed in FIGS. 1–8 inclusive is provided with a relatively wide axially disposed peripheral flange 626 offset at 627 to receive and centrally support a preferably reflective ornamental disc 650 by its peripheral flange 651, the central portion of said reflective ornamental disc 650 being maintained in spaced relationship with respect to the central portion of the wheel cover element 625 and the wheel spider 33 of the vehicle wheel 21.

The wheel cover element 625 of the wheel trim 600 is preferably of a smooth bubble or other hollow transparent generally dome shaped relatively plain construction of a selected color or tint, while the ornamental disc 650 may be of a solid reflective color or of a plain plastic first surface plated at FSP to provide a very high reflective quality. The aesthetic design of the ornamental disc 650 may simulate artillery wheels, spoked wheels, sunburst wheels or any other design preferably having angularly related surfaces providing extra high reflective qualities during rotation of the wheel 21 upon which wheel trim 600 of the invention is mounted.

The ornamental disc 650 may be permanently secured to the wheel cover element 625 at the offset 627 in the peripheral flange 626 thereof by cementing the peripheral flange 651 of the ornamental disc 650 thereto as indicated at 652 in FIG. 13, or, the said ornamental disc 650 may be removably secured at its peripheral flange 651 to the wheel cover element 625 at the said offset 627 in the peripheral flange 626 thereof by any suitable means such as an adhesive tape 653 as shown in FIG. 14. The latter will permit the purchaser of wheel trim 600 embodying the invention to select at the point of sale a particular ornamental disc 650 of his own choosing, or, to change the ornamental effect of his vehicle wheel trim 600 without having to discard the wheel cover element 625 or the means employed to removably secure the wheel trim 600 to the vehicle wheel 21 by merely substituting an ornamental disc 650 of one design for another ornamental disc of a different design.

Actual experimental use of a variety of colored tints of translucent plastic material for the wheel cover element 625 backed up by a first surface plated ornamental disc 650 disposed in spaced relationship thereto produces highly desirable three dimensional ornamental effects heretofore impossible to obtain in vehicle wheel trim constructions. In addition, by the way of example, a wheel cover element 625 of a suitable translucent red or red tint plastic backed up by a first surface chrome plated plastic disc 650 disposed in spaced relationship thereto not only provides a desirable ornamental three dimensional wheel cover effect but provides an unmistakable reflective red warning signal of the approach of a vehicle to a street or road intersection when the approaching vehicle's wheels are picked up in the headlight beam of another vehicle being driven toward the same intersection at an angular relationship to the first mentioned vehicle equipped with such vehicle wheel trim of the invention.

Because of the fact that the ornamental disc 650 and the wheel cover element 625 may be sealed or tightly secured together at their peripheral flanges, a dead or substantially dead air space is provided therebetween thereby eliminating the accumulation of dirt or moisture on the inner surfaces thereof.

It is obvious that the several embodiments of vehicle wheel trim of the invention herein disclosed in FIGS. 1–12 inclusive can be modified to provide back-up plates for the wheel cover elements thereof in the manner and for the purpose described for the embodiment of the inventions disclosed in FIGS. 13 and 14.

Although but several embodiments of the invention and modifications thereof have been disclosed in the drawings and described herein, it is obvious that many changes may be made in the size, shape, arrangement, detail and aesthetic design of the various elements of the invention, all without departing from the spirit and scope thereof as defined in the appended claims.

We claim:

1. A vehicle wheel trim for a vehicle wheel of the type including a wheel spider and a drop center rim having an axially outwardly extending tire bead seat forming an axially extending tire bead seat annulus with an axially inner annular anchorage recess therein adjacent to and terminating at the outer side wall of the drop center of said drop center rim, said vehicle wheel trim comprising a generally dome shaped transparent plastic wheel cover element of a selected color including a radially outwardly disposed circumferential anchorage flange, an annular resilient anchorage means generally right angular in shape having radially inwardly and axially outwardly disposed legs with a radially inner circumferential slot in said radially inwardly disposed leg, said resilient anchorage means having its radially inwardly disposed leg telescoped at said inner circumferential slot therein over said circumferential flange of said wheel cover element.

the said axially outwardly disposed leg of said resilient anchorage means being formed to seat in said axially inner annular anchorage recess in said tire bead seat annulus and to abut the outer side wall of the drop center of said drop center rim, said resilient anchorage means having an axially and radially extending outer generally angular seat formed therein, and an expansible spring retainer ring disposed on said angular seat of said resilient anchorage means in axial abutment with said radially inwardly disposed leg thereof constantly urging said resilient anchorage means in firmly seated relationship in said axially inner annular anchorage recess in said tire bead seat annulus of said vehicle wheel.

2. A vehicle wheel trim as claimed in claim 1 wherein the said expansible retainer ring is substantially half-round in cross section with the flat portion thereof disposed against inner radially extending portion of the angular seat of said resilient anchorage means when said vehicle wheel trim is mounted on a vehicle wheel within the tire bead seat annulus thereof.

3. A vehicle wheel trim as claimed in claim 1 wherein the said annular resilient anchorage means is provided with not less than two axially spaced circumferential anchorage teeth extending radially outwardly from the axially disposed leg thereof, at least one of said anchorage teeth being disposed in said tire bead seat anchorage recess when said vehicle wheel trim is mounted on a vehicle wheel.

4. A vehicle wheel trim as claimed in claim 1 wherein the said expansible retainer ring is full-round in cross section.

5. A vehicle wheel trim as claimed in claim 1 wherein the said expansible retainer ring is full-round in cross section, and the said annular resilient anchorage means is grooved at the axially and radially outer angular seat therein to accommodate said full-round expansible retainer ring.

6. A vehicle wheel trim as claimed in claim 1 wherein the said expansible retainer ring is angular in cross section having axially outwardly and radially inwardly disposed legs bearing against said resilient anchorage means at said axially and radially extending outer angular seat thereof.

7. A vehicle wheel trim as claimed in claim 1 wherein the said expansible retainer ring is angular in cross section having axially outwardly and radially inwardly disposed legs bearing against said resilient anchorage means at said axially and radially extending outer angular seat thereof, and a circumferential outer rib formed at the heel of the axially outwardly disposed leg thereof, the said annular resilient anchorage means having its axially and radially extending angular seat grooved adjacent the radially outer leg thereof to accommodate said circumferential outer rib of said angular expansible retainer ring.

8. A vehicle wheel trim for a vehicle wheel of the type including a wheel spider and a drop center rim having an axially outwardly extending tire bead seat forming an axially extending tire bead seat annulus with an axially inner annular anchorage recess therein adjacent to and terminating at the outer side wall of the drop center of said drop center rim, said vehicle wheel trim comprising, in combination, a generally dome shaped transparent plastic wheel cover element of a selected color including a radially outwardly disposed circumferential anchorage flange, a reflective ornamental disc having an ornamental central portion spaced rearwardly from the dome of said wheel cover element including a circumferential flange and means securing the same to the circumferential anchorage flange of said wheel cover element, an annular resilient anchorage means generally right angular in shape having radially inwardly and axially outwardly disposed legs with a radially inner circumferential slot in said radially inwardly disposed leg, said resilient anchorage means having its radially inwardly disposed leg telesecoped at said inner circumferential slot therein over said circumferential anchorage flange of said wheel cover element, the said axially outwardly disposed leg of said resilient anchorage means being formed to seat in said axially inner annular anchorage recess in said tire bead seat annulus and to abut the outer side wall of the drop center of said drop center rim, said resilient anchorage means having an axially and radially extending outer generally angular seat formed therein, and an expansible spring retainer ring disposed on said angular seat of said resilient anchorage means in axial abutment with said radially inwardly disposed leg thereof constantly urging said resilient anchorage means in firmly seated relationship in said axially inner annular anchorage recess in said tire bead seat annulus of said vehicle wheel.

9. A vehicle wheel trim as claimed in claim 8 wherein the reflective ornamental disc is first surface plated.

10. A vehicle wheel trim as claimed in claim 8 wherein the reflective ornamental disc is of a color contrasting with respect to that of said wheel cover element.

11. A vehicle wheel trim as claimed in claim 8 wherein the means for securing the said reflective ornamental disc to said wheel cover element provides a dead air space therebetween.

References Cited
UNITED STATES PATENTS

| | | | |
|---|---|---|---|
| 2,736,610 | 2/1956 | Waite | 301—37 |
| 2,812,215 | 11/1956 | Waite | 301—37 |
| 3,252,739 | 5/1966 | Huntley | 301—37 |
| 3,265,441 | 8/1966 | Baldwin | 301—37 |

RICHARD J. JOHNSON, *Primary Examiner.*